Patented July 16, 1940

2,207,721

UNITED STATES PATENT OFFICE 2,207,721

SPRAY COMPOSITION

Gerald H. Coleman, Midland, Mich., assignor to The Dow Chemical Company, Midland, Mich., a corporation of Michigan No Drawing. Application June 16, 1939, Serial No. 279,467

12 Claims. (Cl. 167—24)

This invention concerns compositions particularly adapted for combating flies, mosquitoes, moths, and similar insects.

Petroleum-distillate sprays containing extracts of such insecticidal plant products of pyrethrum flowers, derris, cube, barbasco, and the like, are widely used for the control of household insect pests. Pyrethrin-containing sprays have a quick paralyzing action on flies but generally speaking the kill obtained thereby is low compared to the percentage knockdown. Rotenone-containing compositions give a more permanent control but are relatively slow in their action, requiring a considerable period of time to kill insect pests contacted therewith. Both of the above-mentioned toxicants also suffer from the disadvantage that they are unstable to heat, air, and light, and upon storage lose their effectiveness to a considerable degree.

I have discovered that when a small amount of an allyl or 2-chloro-allyl ether of a phenol is added to solutions of such toxicants as the pyrethrins and rotenone, improved spray compositions are obtained which are more stable to heat and light and have a greater paralyzing effect and greater lethal effect against insects than the original extract-containing compositions. These sprays give a kill against flies, for example, which more closely approximates the percentage knockdown of such pests than do common household insect sprays heretofore employed. Furthermore, the allyl and 2-chloro-allyl ethers of phenols may be substituted for the extracts of insecticidal plant products in spray compositions. The resulting solutions compare favorably in toxic effect with those of the plant extracts and have the added advantage of being substantially colorless and odorless and being relatively stable to heat, light, and air.

When the allyl or 2-chloro-allyl ether is used alone as the toxicant in an insect spray composition, a concentration from about 2 to about 10 per cent in an inert organic solvent is suitable. For use in stabilizing and/or fortifying pyrethrin- or rotenone-containing spray compositions, the allyl or 2-chloro-allyl ether is preferably employed in amount of from about 0.2 to 3 grams per 100 milliliters of the spray solution.

The ethers I have found particularly valuable as insecticidal toxicants and stabilizers for pyrethrin- and rotenone-containing spray compositions are those having the formula R—O—X wherein R represents an aromatic radical and X is allyl or 2-chloro-allyl. These compounds may be prepared by heating a mixture of a phenol, alcohol, caustic, and allyl or 2-chloro-allyl chloride to a refluxing temperature, usually between 80° and 100° C. Following completion of the reaction the ethereal reaction product may be distilled to remove alcohol, then extracted with ethyl ether, benzene, or other water-immiscible organic solvent, and the extract fractionally distilled under reduced pressure to obtain the desired allyl or 2-chloro-allyl ether in substantially pure form. While any suitable amounts of the phenol and allyl or 2-chloro-allyl chlorides may be reacted together, equimolecular proportions have been found to give the desired ether compounds in good yield. My co-pending application Serial No. 242,281, filed November 24, 1938, discloses the preparation and properties of a number of these compounds. The allyl and 2-chloro-allyl ethers falling within the scope of the above formula have been found to be substantially odorless, colorless, and comparatively innocuous as regards human beings and warm-blooded animals. Particularly advantageous is the fact that they do not appear to cause irritation and dermatitis upon contact with living tissue and skin.

The method employed in determining the insecticidal toxicities of solutions of the above compounds and combinations thereof with pyrethrins and rotenone is substantially that described in Soap, 8, No. 4 (1932), and known as the Peet-Grady method. The terms "per cent" and "percentage" as employed in the specification and claims with reference to the composition of various spray materials refer to grams per 100 milliliters thereof unless otherwise specified. For purpose of comparison in the examples, a control pyrethrin solution was employed consisting of the extract of the toxic principles from 1 pound of pyrethrum flowers dissolved in 1 U. S. gallon of a petroleum distillate having a boiling range of 345°–508° F. and a flash point of 137° F.

The invention is illustrated by the following examples:

Example 1

3 grams of the allyl ether of 2-chloro-4-tertiary-butyl phenol (boiling at 140°–142° C. at 10 millimeters pressure and having the specific gravity 1.045 at 20°/4° C.) were dissolved in sufficient of the petroleum distillate employed in the preparation of the control solution to give 100 milliliters of spray composition. This solution was tested against three-day old houseflies according to the Peet-Grady method and found to give a knockdown of 65 per cent of the test insects in 15 minutes and a kill of 52 per cent in 48 hours.

This solution was substantially odorless, non-irritating, and colorless, and did not deteriorate with respect to toxicity on storage and exposure to light and air.

In a similar manner other representative allyl and 2-chloro-allyl ethers of the phenols were tested to determine their effectiveness as toxicants in petroleum distillate solutions. The data set forth in the following table is representative of that obtained with 3 per cent solutions of such toxicants:

| Compound | Percent knockdown in 10 minutes | Percent mortality in 48 hours |
|---|---|---|
| Pyrethrin control solution | 99 | 47 |
| Allyl ether of 2-chloro-4-phenylphenol (B. P. 158°–161° C. at 3 mm. pressure) | 62 | 47 |
| Allyl ether of 4-phenylphenol (melting at 79°–80° C.) | 87 | 50 |
| Allyl ether of 2-bromo-4-phenylphenol (B. P. 165°–168° C. at 3 mm. pressure) | 54 | 35 |
| Allyl ether of 6-chloro-2-phenylphenol (B. P. 138°–141° C. at 2 mm. pressure) | 75 | 35 |
| 2-chloro-allyl ether of 4-phenylphenol (melting at 75°–76° C.) | 91 | 57 |
| 2-chloro-allyl ether of 4-cyclo-hexyl-phenol (B. P. 160°–163° C. at 4 mm. pressure) | 81 | 36 |
| 2-chloro-allyl ether of 4-tertiary-butyl-phenol (B. P. 120°–122° C. at 5 mm. pressure) | 71 | 30 |

*Example 2*

One gram of the allyl ether of 4-phenylphenol and 50 milliliters of the pyrethrin control solution were mixed together and diluted with an additional 50 milliliters of the petroleum distillate described above. This spray material was compared with a 50 per cent dilution of the control solution to determine the resistance of the two sprays to decomposition upon exposure to air, heat, and light. The diluted control solution showed a knockdown of 95 per cent in 10 minutes and a kill of 27 per cent in 48 hours. The mixture of control solution, allyl ether of 4-phenylphenol, and petroleum distillate gave a percentage knockdown of 96 in 10 minutes and a percentage kill of 48 in 48 hours. These compositions were then exposed for 72 hours to the rays of a mercury vapor lamp in a standard fadeometer at a constant temperature of 57° C. The light employed had an intensity of 4000 foot-candles. Following this exposure, both samples were cooled to room temperature and retested according to the Peet-Grady method substantially as described above. The observed toxicities for the diluted control solution were found to be 87 per cent knockdown in 10 minutes and 17 per cent kill in 48 hours. The percentage knockdown in 10 minutes and kill in 48 hours for the composition comprising the allyl ether were 94 and 44, respectively.

It is evident from the foregoing that the solution of pyrethrum extract was decomposed by the exposure to ultra-voilet light so as to be 37 per cent less effective with respect to kill against houseflies. A similar solution fortified and stabilized with the allyl ether compound showed a decrease in efficiency of less than 9 per cent with respect to kill upon similar treatment.

*Example 3*

2-chloro-allyl ether of 4-phenylphenol was substituted for the corresponding allyl ether as disclosed in Example 2 in the preparation of a fortified and stabilized pyrethrin spray. The initial toxicity of the pyrethrin solution alone when tested according to the Peet-Grady method was 27 per cent kill in 48 hours. The initial kill observed with the composition containing the 2-chloro-allyl ether of 4-phenylphenol was 40 per cent in 48 hours. These two spray compositions were exposed in the fadeometer to ultra-violet rays substantially as described, for a period of 24 hours, cooled to room temperature and retested. The pyrethrin solution was found to have decreased in effectiveness so as to give a kill of only 18 per cent in 48 hours. The spray containing the 2-chloro-allyl ether and pyrethrin when similarly tested gave a kill of 38 per cent. The reduction in toxicity shown by the pyrethrin solution was 33 per cent while that shown by the composition comprising the 2-chloro-allyl ether was 5 per cent.

By substituting other allyl and 2-chloro-allyl ethers for those disclosed in the foregoing examples, insecticidal compositions may be obtained of comparable efficiency in the control of household and related insect pests. Representative of such compounds are allyl ether of 4-tertiary-butyl-2-phenylphenol, boiling at 150°–153° C. at 2 millimeters pressure; allyl ether of chloro-2-cyclohexyl phenol, boiling at 130°–132° C. at 3 millimeters pressure; allyl ether of 2-phenyl-phenol, boiling at 129°–131° C. at 3 millimeters pressure; allyl ether of 4-chloro-2-phenylphenol, boiling at 142°–145° C. at 3 millimeters pressure; allyl ether of 4-tertiary-butyl phenol, boiling at 107°–109° C. at 3.5 millimeters pressure; allyl ether of ortho-cresol; allyl ether of 2.4-dichlorophenol; allyl ether of 2.4.6-tribromophenol; allyl ether of 4-benzyl phenol; allyl ether of 2-chloro-4-benzyl phenol; allyl ether of 2-aceto-phenol; allyl ether of 4-tertiary-amyl phenol; allyl ether of 4-tertiary-octyl phenol; allyl ether of naphthol; allyl ether of phenanthrol; allyl ether of 4-octadecanyl phenol; 2-chloro-allyl ether of phenol, boiling at 108°–110° C. at 20 millimeters pressure; 2-chloro-allyl ethers of mixed isomeric-dimethyl phenols boiling at 123°–125° C. at 10 millimeters pressure; 2-chloro-allyl ether of 2.4.6-trichlorophenol, freezing at 34° C.; 2-chloro-allyl ether of 2-chloro-4-tertiary-butyl phenol, boiling at 134°–137° C. at 3 millimeters pressure; 2-chloro-allyl ether of 2-phenylphenol boiling at 136°–137° C. at 2 millimeters pressure; 2-chloro-allyl ether of carvacrol; 2-chloro-allyl ether of thymol; 2-chloro-allyl ether of meta-phenylphenol; 2-chloro-allyl ether of 4-benzyl phenol; 2-chloro-allyl ether of 4-methyl naphthol; 2-chloro-allyl ether of 2.4-dinitro-phenol; 2-chloro-allyl ether of 4-phenylethyl phenol; 2-chloro-allyl ether of 4-amino-phenol; 2-chloro-allyl of naphthol; etc.

Mixtures of the above compounds may be dissolved in suitable solvents to obtain liquid spray materials having desirable characteristics as regards insecticidal toxicities, percentage of knockdown and kill, and stability to light and heat. Likewise, the allyl and 2-chloro-allyl ethers of phenols may be employed as stabilizers with extracts of derris, cube, barbasco, and other insecticidal plant products. Beside petroleum distillates other organic solvents such as benzene, ethylene chloride, hydrogenated naphthalene, butyl alcohol, etc., may be employed provided only that such solvents be inert with respect to the toxicants employed, capable of dissolving the insecticidal plant products and/or allyl or 2-chloro-allyl ethers in the required amounts, and "non-corrosive" in the sense that they be non-injurious to the skin and general health of humans.

Other modes of applying the principle of my invention may be employed instead of those explained, change being made as regards the materials or the amounts thereof employed, provided the compositions defined by any of the following claims or their equivalent be employed.

I therefore particularly point out and distinctly claim as my invention:

1. An insecticidal spray comprising a non-corrosive organic solvent having dissolved therein as an active toxicant a compound having the formula R—O—X wherein R represents an aromatic radical and X is selected from the group consisting of the allyl and 2-chloro-allyl radicals.

2. An insecticidal spray comprising a non-corrosive organic solvent having dissolved therein a product selected from the class consisting of the extracts of pyrethrin- and rotenone-bearing plants and as an added toxicant and stabilizer a compound having the formula R—O—X wherein R represents an aromatic radical and X is selected from the group consisting of the allyl and 2-chloro-allyl radicals.

3. An insecticidal spray comprising a non-corrosive organic solvent having dissolved therein an extract of a pyrethrin bearing plant and as an added toxicant and stabilizer a compound having the formula R—O—X wherein R represents an aromatic radical and X is selected from the group consisting of the allyl and 2-chloro-allyl radicals.

4. An insecticidal spray comprising a non-corrosive organic solvent having dissolved therein as an active toxicant a compound having the formula R—O—CH$_2$—CH=CH$_2$ wherein R represents an aromatic radical.

5. An insecticidal spray comprising a non-corrosive organic solvent having dissolved therein as an active toxicant a compound having the formula R—O—CH$_2$—CCl=CH$_2$ wherein R represents an aromatic radical.

6. An insecticidal spray comprising a non-corrosive organic solvent having dissolved therein as an active toxicant a compound having the formula R—O—X wherein R represents an aromatic radical, and X is selected from the group consisting of the allyl and 2-chloro-allyl radicals, in amount ranging between 0.2 and 10 grams per 100 milliliters thereof.

7. An insecticidal spray comprising a non-corrosive organic solvent having dissolved therein as an active toxicant a compound having the formula R—O—X wherein R represents a halogen-substituted aromatic radical and X is selected from the group consisting of the allyl and 2-chloro-allyl radicals.

8. An insecticidal spray comprising a non-corrosive organic solvent having dissolved therein as an active toxicant a compound having the formula

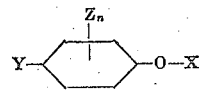

wherein X is selected from the group consisting of the allyl and 2-chloro-allyl radicals, Y represents a hydrocarbon radical, Z represents a member of the group consisting of hydrogen and the hydrocarbon radicals, and $n$ is an integer not greater than 3.

9. An insecticidal spray comprising a non-corrosive organic solvent having dissolved therein as an active toxicant a compound having the formula

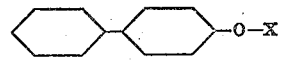

wherein X is selected from the group consisting of the allyl and 2-chloro-allyl radicals.

10. An insecticidal spray comprising a non-corrosive organic solvent having dissolved therein as an active toxicant the allyl ether of 4-phenylphenol.

11. An insecticidal spray comprising a non-corrosive organic solvent having dissolved therein as an active toxicant the 2-chloro-allyl ether of 4-phenylphenol.

12. An insecticidal spray comprising a non-corrosive organic solvent having dissolved therein as an active toxicant the allyl ether of 2-chloro-4-tertiary-butyl phenol.

GERALD H. COLEMAN.